G. M. EATON.
ELECTRIC LOCOMOTIVE.
APPLICATION FILED AUG. 11, 1913.
1,184,836.
Patented May 30, 1916.
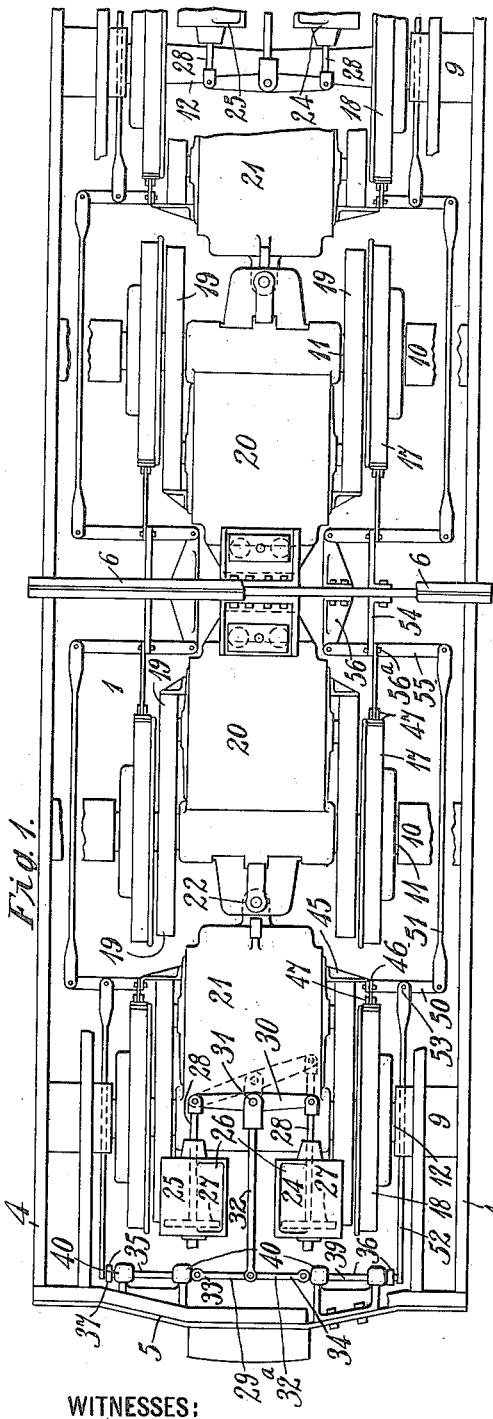
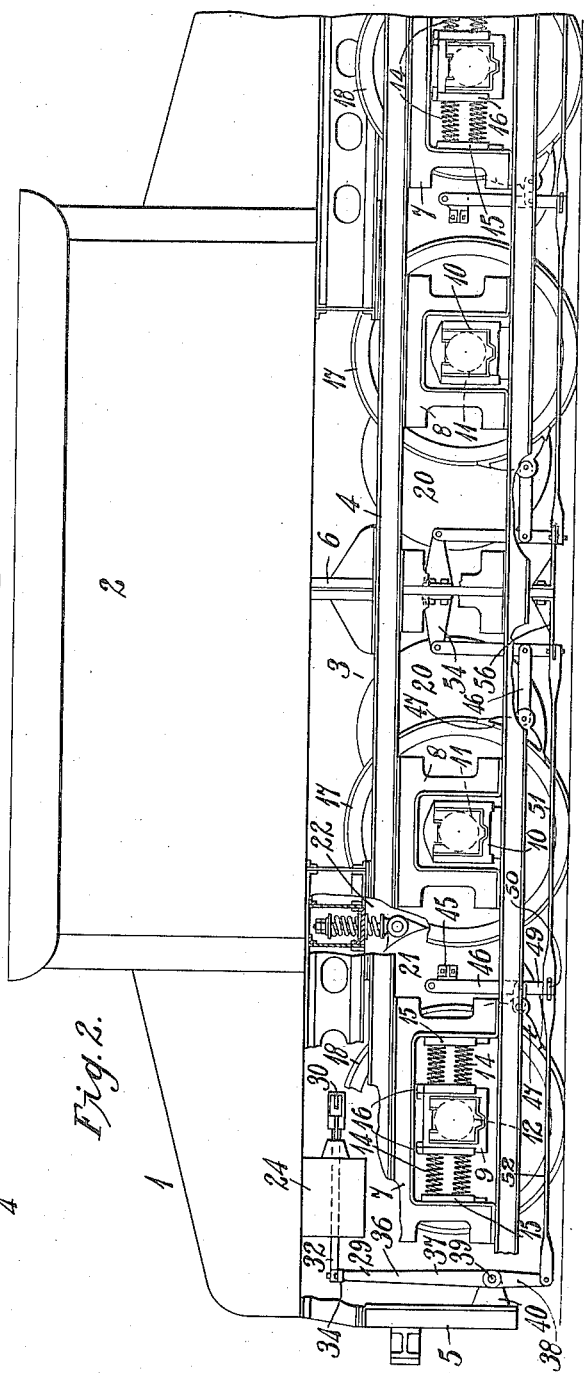
WITNESSES:
Fred H. Miller
INVENTOR
George M. Eaton
BY
Wesley E. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

1,184,836.                    Specification of Letters Patent.    Patented May 30, 1916.

Application filed August 11, 1913.   Serial No. 784,049.

*To all whom it may concern:*

Be it known that I, GEORGE M. EATON, a citizen of the United States, and a resident of Pittsburgh, in the county of Allegheny and State of Pennsylvania, have invented a new and useful Improvement in Electric Locomotives, of which the following is a specification.

My invention relates to electric locomotives, and it has special reference to the foundation brake gear of an electric locomotive having both rigid and pivotally mounted wheel axles.

One of the objects of my invention is to provide a simple and effective brake rigging for a locomotive or other vehicle of the type above mentioned, by means of which brakes may be applied concurrently to the wheels of the rigid and pivotally mounted axles.
Another object of my invention is to provide a plurality of operating brake cylinders which are associated with a single foundation brake gear or brake rigging in such manner that an equalized brake action shall be effected upon the wheels, even though one of the operating cylinders be disabled.

More specifically, the object of my invention is to provide a thoroughly flexible equalizing brake rigging which is adapted particularly for operation upon an electric locomotive like that set forth in detail in my co-pending application, Serial No. 566,134, filed June 10th, 1910, and assigned to the Westinghouse Electric & Manufacturing Company.

Inasmuch as my invention pertains to the brake rigging of a locomotive or vehicle and only indirectly to the vehicle itself, I shall confine the following description particularly to the brake rigging and shall set forth the locomotive structure only in a general way.

In the accompanying drawing, Figure 1 is a plan view of certain portions of an electric locomotive constructed in accordance with my invention, and Fig. 2 is a view in side elevation of the locomotive shown in Fig. 1.

Referring to the drawing, a locomotive 1 comprises a cab 2 which is suitably mounted upon a locomotive gear 3 comprising suitable side frames 4 that are rigidly associated at their ends and intermediate portions by cross ties or beams 5 and 6. The side frames
4 are provided with a plurality of pedestals 7 and 8 provided with journal boxes 9 and 10 which are associated with driving axles 12 and 11, respectively. The driving axles 11 are provided with journal boxes 10 which are vertically adjustable within the pedestals 8 in the usual manner, while the driving axles 12 have both vertical and horizontal movement relative to the pedestals 7, by reason of the fact that the journal boxes 9, which are associated with the axles 12, are resiliently supported in position by means of heavy coil springs 14, the ends of which are respectively secured to the sides 15 of the pedestals 7 and to the sides 16 of the journal boxes 9.

The driving axles 11 are provided with wheels 17 and together form a central truck having a rigid wheel base, while the driving axles 12 are provided with wheels 18 and constitute radial pony trucks, as will hereinafter be more fully set forth.

The central rigid driving axles 11 have suitable gear connections 19 to driving motors 20 which are supported in a well-known manner from the locomotive gear 3 and driving axles 11. The end driving axles 12 are severally provided with driving motors 21 that are similarly supported to constitute parts of trucks which are respectively pivoted at points 22 to the adjacent middle driving motors 20 in such a manner as to provide for radial movements thereof. The pivotal connections 22 are preferably adapted for both longitudinal and vertical movements relative to the locomotive gear frame 3, although not necessarily so.

Beneath each end of the locomotive cab 2 are a pair of operating brake cylinders 24 and 25 which are placed side-by-side and may be attached to the cab body 2. The cylinders 24 and 25 are of like construction, and each comprises a cylinder proper 26, a movable piston 27 and a piston rod 28. The arrangement of parts is such that, under normal operating conditions, the piston 27 has considerable clearance between it and the adjacent end of the cylinder 26.

Both sets of operating cylinders are severally connected to floating equalized brake riggings 29 which are adapted to brake the wheels 17 and 18 of the rigid and pivotally mounted driving axles 11 and 12 located on that end of the locomotive 1. The brake riggings 29 are constructed in like manner, and, inasmuch as they are alike in operation, a detailed description of only one of them is deemed necessary. Attention is, therefore, directed to the brake rigging 29 of the left hand portion of the locomotive 1. The piston rods 28 of the operating cylinders 24 and 25 are mechanically associated by means of an equalizing beam 30, the ends of which are pivotally connected to the respective piston rods 28. At the mid point 31 of the equalizer beam 30, a pull rod 32 is pivotally connected, the other end thereof being similarly associated with an equalizer beam 32ª, the ends 33 and 34 of which are respectively pivotally connected to brake levers 35 and 36. Each of the brake levers 35 and 36 comprises arms 37 and 38 having rigid connection to a shaft 39 which is rotatably supported through the agency of bearings 40, the latter being secured to the cross beam or bumper 5.

Inasmuch as the arrangement of parts of the brake rigging 29 on one side of the locomotive is like that on the other, only the parts associated with one of the sides will be described.

Pivotally suspended from a bracket 45 that forms a part of the motor 21, is a brake hanger 46 which carries a brake shoe 47, in accordance with the usual practice, which shoe is disposed in proximity to the outer periphery of the wheel 18 and is adapted to make frictional engagement therewith. The lower end 49 of the brake hanger 46 is pivotally connected to one end of an equalizer bar 50, the other end of which has a pivotal connection to one end of a pull rod 51. A pull rod 52 has its respective ends pivotally associated with the lower end of the arm 38 of the brake lever 36 and an intermediate point 53 of the equalizer bar 50.

A brake hanger 46 and a brake shoe 47 of a structure similar to that just described, is pivotally suspended from a bracket 54 which is secured to the cross tie 6, and the lower end of the hanger 46 has a pivotal connection with an equalizer bar 55 at an intermediate point 56ª. One end of the bar 55 is pivotally connected to a bracket 56 which is fastened to the cross tie 6 and the other end thereof has a similar connection to an end of the pull rod 51.

Assuming that the arrangement and location of parts is similar to that shown in the drawings and that the proportions and adjustments of the parts are suitably chosen, if a suitable operating fluid be admitted to the cylinders 24 and 25, the resultant actuating force is transmitted through the brake gear or rigging 29 and is distributed equally at the several brake shoes 47 of both the rigid and pivotally mounted driving axles 11 and 12. Moreover, by reason of the equalizing connections, the clearance in the operating cylinders, and the fact that brake hangers 46 of the radial pony truck are suspended directly from the motor 21, or at least from some portion of the truck body, it is clear that an equal distribution of the braking force is made concurrently between the several wheels and coöperating brake shoes, even though the pony truck occupies a position at an angle to its normal position upon tangent track, as is the case upon curves. Moreover, inasmuch as the piston rods 28 of the operating cylinders 24 and 25 are connected by an equalizer bar 30, which is associated with the pull rod 32 at substantially its mid-point, the brake rigging 29 is adapted to perform its intended functions, although to a lesser degree, in the event of breakage or inoperativeness of one of the operating cylinders. If it is assumed that the operating cylinder 25 is disabled and that the cylinder 24 is utilized, the equalizer bar 30 will occupy a position indicated by the dotted lines in Fig. 1. Obviously, the pivotal connection 31 between the equalizer bar 30 and the pull rod 32 is moved substantially half of its normal distance and, hence, it is evident that the operation of the brakes is not entirely prevented by an inoperative brake cylinder.

Although I have shown and described my invention as embodying specific structural details and as applied to an electric locomotive of a particular type, I do not wish to be restricted in this respect, as other structural details and locations and arrangements of parts may be employed without departing from the spirit and scope of my invention.

I claim as my invention:

1. The combination with a single vehicle embodying rigid wheel axles and pivotal wheel axles, of an equalized brake rigging for braking the wheels of said rigid and those of said pivotal axles.

2. The combination with a single vehicle embodying rigid wheel axles and pivotal wheel axles, of an equalized brake gear concurrently braking the wheels of the rigid axles and those of the pivotal axles.

3. The combination with a single vehicle embodying rigid wheel axles and radial wheel axles, of an equalized brake rigging for concurrently braking the wheels of said rigid axles and those of said radial axles.

4. The combination with a locomotive embodying a centrally located truck having a rigid wheel base and a pivotally mounted guiding truck, of an equalized brake rigging for concurrently braking the wheels of the rigid truck and those of the pivotal truck.

5. The combination with a locomotive embodying a frame, a centrally located rigid truck, and a pivotal guiding truck, of an equalized brake rigging movably supported by said frame, rigid and pivotal trucks, for concurrently braking both of said trucks.

6. In a vehicle, the combination with a body, a rigid truck and a radial truck, of an equalized brake rigging comprising brake cylinders, an equalizer bar operatively associated therewith, other equalizer bars respectively associated with the said body and said radial truck, and brake levers and pull rods mechanically connecting all of said equalizer bars.

7. In a vehicle, the combination with a body, a rigid truck and a pivotal truck, of an equalized brake rigging comprising an operating device, an equalizer bar associated therewith, a plurality of equalizer bars respectively pivotally connected to said rigid truck and to said pivotal trucks, and linkage devices mechanically associating said equalizer bars, whereby the wheels of both trucks are concurrently braked.

8. In a vehicle brake rigging, the combination with a pair of operating devices having movable parts, and an equalizer bar connecting said parts, of a power transmitting mechanical linkage, and means for associating said linkage with the mid-point of said equalizer bar.

9. In a vehicle brake rigging, the combination with a pair of fluid-operated pistons disposed side-by-side, and an equalizing bar joining said pistons, of an equalizing brake-actuating linkage pivotally connected to substantially the mid-point of said equalizer bar.

10. In a vehicle, the combination with a pair of centrally located rigid wheel axles and pivotally mounted end wheel axles, of an independent brake rigging for the wheels of the respective halves of the locomotive, each adapted to concurrently brake the wheels of the rigid axles and those of the pivotal axles with which it is associated.

11. In a vehicle, the combination with a body, a rigid truck and a pivotal truck, of an equalized brake rigging embodying equalizer bars respectively associated with said rigid truck and said pivotal truck, and symmetrically arranged side brake levers and pull rods for mechanically connecting said equalizer bars.

12. In a vehicle, the combination with a body, a rigid truck and a pivotal truck, of an equalized brake rigging embodying equalizer bars respectively associated with said rigid truck and said pivotal truck, and side connections between the corresponding ends of said equalizer bars for effecting simultaneous operation thereof.

13. In a vehicle the combination with a body, a rigid truck for supporting said body and a pivotal truck, of an equalized brake rigging for simultaneously braking both the rigid truck and the pivotal truck, that portion of the rigging which operates upon said rigid truck being supported by said body and that portion thereof which operates upon the pivotal truck being supported by said pivotal truck.

14. In a vehicle, the combination with a body, a rigid truck and a pivotal truck, of an equalized brake rigging for simultaneously braking both the rigid truck and the pivotal truck, said rigging being in duplicate for the two sides of the vehicle.

15. In a vehicle brake rigging, the combination with a plurality of actuating devices disposed in side-by-side relation, of equalizing means for associating said actuating devices with said rigging and for permitting an equalized actuation of said rigging when only one actuating device is working.

16. In a vehicle brake rigging, the combination with a plurality of independently actuated power devices disposed in side-by-side relation, and a power transmitting mechanical linkage, of means for associating said devices and said linkage whereby power is transmitted to said linkage when either one or both of said power devices are working.

17. In a vehicle, the combination with a rigid central truck and pivotal end trucks, of an independent brake rigging for each half of the vehicle for working upon the pivotal truck and that portion of the rigid truck associated with the respective halves of the vehicle.

18. In a vehicle, the combination with a plurality of centrally located driving wheels having a rigid wheel base and pivotal end trucks having driving wheels, of independent brake riggings associated with the respective ends of said vehicle for braking the wheels of the respective ends thereof.

In testimony whereof, I have hereunto subscribed my name this 30th day of July, 1913.

GEORGE M. EATON.

Witnesses:
G. R. GOWEN,
B. B. HINES.